Figure 1:
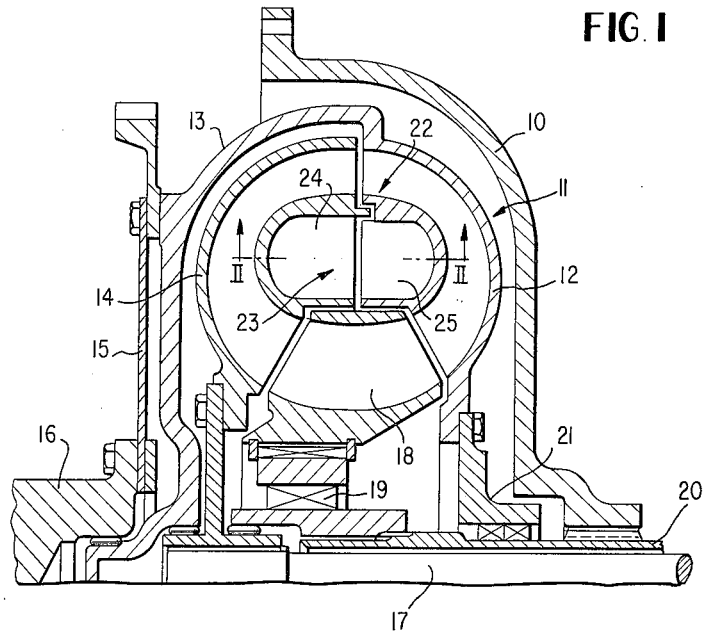

Nov. 30, 1965    M. H. BURCKHARDT    3,220,186
HYDRODYNAMIC TORQUE CONVERTER
Filed Oct. 24, 1962

INVENTOR.
MANFRED H. BURCKHARDT
BY
*Dicke & Craig*
ATTORNEYS

United States Patent Office 3,220,186
Patented Nov. 30, 1965

1

3,220,186
HYDRODYNAMIC TORQUE CONVERTER
Manfred H. Burckhardt, Waiblingen, Germany, assignor to Daimler-Benz Aktiengesellschaft, Stuttgart-Unterturkheim, Germany
Filed Oct. 24, 1962, Ser. No. 232,852
3 Claims. (Cl. 60—54)

The present invention relates to a hydrodynamic torque converter which is suitable in particular for the transmission of torque in motor vehicles.

The present invention is concerned with the problem of providing a torque converter suitable also for purposes of engine braking. It is known that with a pushing output, that is, with a pushing vehicle when the driving engine is pushed or driven by the vehicle, the transmission capacity of a conventional hydrodynamic torque converter becomes extremely small. Consequently, the braking effect of the engine cannot be utilized with a normal conventional torque converter and no continuous braking may be achieved therewith.

It is proposed in accordance with the present invention as a solution to this problem to arrange at each of the pump wheel and turbine wheel of the torque converter, in addition to the usual torque converter blades or vanes, one additional set of blades or vanes which together form a hydrodynamic coupling and are constructed for braking purposes in such a manner that the hydrodynamic coupling has, with a driving turbine wheel, a torque or moment input which is larger by a multiple than with a driving pump wheel.

There results from such a construction the advantage that, with a pushing vehicle, no moment or only a very small portion thereof is transmitted through the torque converter but instead the moment is transmitted through the hydrodynamic coupling. On the other hand, the hydrodynamic coupling, by reason of its special construction, does not affect or only affects slightly the transmission of the driving force through the torque converter with a pulling engine driving the vehicle. However, with a pushing vehicle, that is, when the vehicle drives the engine, the hydrodynamic coupling takes over practically the entire torque.

It is proposed in accordance with the present invention to incline or curve the blades or vanes at the hydrodynamic coupling, with reference to the forward direction of rotation of the pump wheel of the torque converter, forwardly at the primary member and rearwardly at the secondary member thereof. Preferred is a construction in accordance with the present invention in which the hydrodynamic coupling is arranged within the core ring of the torque converter and in which the turbine wheel of the torque converter forms or supports the primary blading of the hydrodynamic coupling and the pump or impeller wheel of the torque converter the secondary blading of the hydrodynamic coupling. As a result thereof, no additional space requirement arises for the hydrodynamic coupling, and the "brake converter" in accordance with the present invention is practically of no larger structural dimension than a conventional torque converter with the same capacity. With a torque converter having several turbine wheels, the primary blading of the hydrodynamic coupling in accordance with the present invention is provided at the turbine wheel which offers the highest rotational speed with the normal output overtaking the normal input thereof.

Accordingly, it is an object of the present invention to provide a hydrodynamic torque converter of the type described hereinabove which eliminates, by simple means, the shortcomings and inadequacies encountered in the prior art constructions.

It is another object of the present invention to provide

2 a hydrodynamic torque converter, especially for motor vehicles, that is suitable not only to transmit the driving forces from the engine to the driven wheels but also to permit use of the engine for braking purposes when the vehicle drives the engine.

Still another object of the present invention resides in in the provision of a torque converter for motor vehicles which is provided with a hydrodynamic coupling so constructed and arranged as to permit use of the engine as brake without adversely affecting the transmission of driving torque from the engine to the driven wheels.

Still another object of the present invention resides in the provision of a hydrodynamic torque converter in which nearly the entire driving force or torque is transmitted through the torque converter while nearly the entire braking force is transmitted through a hydrodynamic coupling operatively associated with the torque converter.

Another object of the present invention resides in the provision of a hydrodynamic torque converter of the type described hereinabove which fulfills, by simple means, the afore-mentioned objects and purposes and has relatively small space requirements so as to assure a structural dimension which is substantially the same as that of conventional torque converters of the same capacity.

Figure 2:
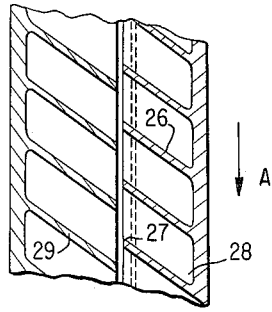

These and other objects, features and advantages of the present invention will become more obvious from the following description when taken in connection with the accompanying drawing which shows, for purposes of illustration only, one embodiment in accordance with the present invention, and wherein FIGURE 1 is an axial cross-sectional view through a torque converter in accordance with the present invention, and FIGURE 2 is a partial cross-sectional view taken along line II—II of FIGURE 1.

Referring now to the drawing wherein like reference numerals are used throughout the two views thereof, and more particularly to FIGURE 1, reference numeral 10 designates therein a housing which may be flangedly connected, in a manner not illustrated herein, with the engine block. A hydrodynamic torque converter, generally designated by reference numeral 11, is arranged within the housing 10. The torque converter 11 consists, as is conventional, of a pump or impeller wheel 12 which surrounds with the housing part 13 thereof the turbine wheel 14 and which is operatively connected by means of this housing part 13 through an elastic intermediate member 15 with the driving shaft 16. The turbine wheel 14 is operatively connected for rotation in unison with the output or driven shaft 17. The guide wheel 18 of the torque converter 11 is also supported, in a conventional manner, by means of a one-way free-wheeling device 19 on a hollow shaft 20 secured or rigid with the stationary housing. The pump wheel 12 is also sealed against this hollow shaft 20 by a flange part 21 and possibly is once more supported thereon by suitable bearings.

The three wheels 12, 14 and 18 of the torque converter carry the normal converter blades or vanes and together form a toroidal fluid circuit comprising inner and outer shell means. A hydrodynamic coupling generally designated by reference numeral 23 is arranged within the core ring of the torus of the toroidal fluid circuit, this ring being generally designated by reference numeral 22 of the torque converter, which hydrodynamic coupling 23 consists of a primary shell or member 24 comprising first blades 29 and of a secondary shell or member 25 comprising second blades 26 cooperating with the first blades 29 to form a second toroidal fluid circuit. The former member is formed by the turbine wheel 14 of the torque converter 11, and the latter by the pump wheel 12 of the torque converter.

The blading or vanes 29 and 26 of the two coupling members or shells 24 and 25 are inclined, as shown in FIGURE 2, with respect to a line parallel to the axis. This inclination is realized in such a manner that the hydrodynamic coupling 23 becomes effective practically only when the output 17 overtakes the input 16, i.e. when the vehicle pushes the engine. With reference to the forward direction of the torque converter, indicated by arrow A, the blading or vanes are inclined forwardly at the primary shell 24 and are inclined rearwardly at the secondary shell 25. The blades 26 of the secondary shell 25 constituted by the pump wheel 12 are, therefore, disposed with the blade edges 27 thereof, with reference to the normal direction of rotation, as indicated by arrow A, behind the blade base 28. The blades 29 are inclined in the same direction, as seen in cross section, at the primary shell 24 constituted by the turbine wheel 14, i.e. the edges thereof are disposed in front of the blade base with reference to the direction of rotation A.

In the normal forward direction of rotation, the liquid flow approaches the coupling blades 29 of the primary shell 24 from the rear with a pulling pump wheel 12, that is, during normal drive. The torque transmitted is thereby extremely small. The torque is therefore absorbed or taken over practically exclusively by the torque converter during pulling by the engine. The construction may thereby be realized in such a manner that the power input of the hydrodynamic coupling with a pulling engine amounts to no more than at the most 10% of the power input with a pushing vehicle, or put in another way, the latter input amounts to ten times the former input, the torque capacity of the said latter input thus being a multiple of the torque capacity of the said former input.

With a pushing vehicle, that is, when the turbine wheel 14 with the primary shell 24 of the hydrodynamic coupling 23 overtakes the pump wheel 12 in the direction of arrow A, the liquid flow approaches the coupling blades 26 of the secondary shell 25 from the front. The coupling 23 thereby offers a very large torque or moment input capacity. Consequently, the coupling 23 transmits practically or almost completely the entire pushing moment, whereas the torque converter absorbs or takes over only a very slight diminishing rest.

During pulling, the torque converter 11 and the additional coupling 23 are connected effectively in parallel. Consequently, if the engine is to maintain its standstill braking rotational speed, then the power input capacity of the torque converter has to be reduced accordingly. The conversion of the overall installation is, therefore, somewhat less than that of the torque converter alone since the torque or moment absorbed or taken over by the coupling passes through without torque conversion. If one designates with $a=$ the proportion of the moment or torque input of the torque converter;
$b=$ the proportion of the moment or torque input of the coupling;
$i_m=$ the torque conversion of the torque converter alone;
$i_{mges}=$ the conversion of the overall system, then
$i_{mges} = i_m \cdot a + b = i_m \cdot a + (1-a)$
$\qquad = (i_m - 1)a + 1$
since $a+b=1$.

As a rule, the coupling has to be approximately so constructed that, during pulling, it transmits about 10% of the overall or total moment. The slippage with a pushing vehicle then becomes approximately equal to the slippage with a pulling engine with the same moment. The torque converter can absorb or take over, in that case, only approximately 90% of the total moment. This may be achieved by rotating back or bending back the pump blading. Ordinarily, the conversion increases slightly so that the conversion of the overall system lies only slightly below that of the converter without additional coupling.

While I have shown and described one embodiment in accordance with the present invention, it is understood that the same is not limited thereto but is susceptible of many changes and modifications within the spirit and scope thereof and I, therefore, do not wish to be limited to the details shown and described herein but intend to cover all such changes and modifications as are encompassed by the scope of the appended claims.

I claim:

1. A hydrodynamic torque converter, especially for the transmission of torque in motor vehicles from an input member to an output member, comprising bladed pump wheel means connected to said input member, bladed turbine wheel means connected to said output member and bladed reaction means, all three of said means having outer and inner shell means forming a first toroidal fluid circuit, a second toroidal fluid circuit disposed within the core of the torus of said first toroidal fluid circuit formed by said pump and turbine inner shell means, said second toroidal fluid circuit comprising blade means including first blades carried by the inner shell means of said pump wheel means and cooperating with second blades carried by the inner shell means of said turbine wheel means, said first blades and said second blades being so constructed that they are operable for braking purposes, said first blades and said second blades being constructed as radial blades having free adjacent ends disposed in a radial plane, said first blades being pitched backward in the sense that their free ends lag their base ends, said second blades being pitched forward to a like degree in the sense that their said free ends precede their base ends with respect to normal rotation of said pump wheel means and said turbine wheel means, whereby said first blades and said second blades transmit minimum torque when said pump wheel means overruns said turbine wheel means, and said first blades and said second blades transmit maximum torque when said turbine wheel means overruns said pump wheel means, the torque input capacity of said blade means in cooperation with said turbine wheel means being larger than the torque input capacity of said blade means in cooperation with said pump wheel means.

2. A hydrodynamic torque converter according to claim 1, wherein the amount of said first-named capacity is a multiple of said second-named capacity.

3. A hydrodynamic torque converter according to claim 1, wherein portions of said inner shell means of said pump wheel means and of said turbine wheel means overlie said inner shell means of said reaction member.

References Cited by the Examiner
UNITED STATES PATENTS

| 1,858,514 | 5/1932 | Lell | 60—54 |
| 2,046,703 | 7/1936 | Sinclair | 60—54 |
| 2,651,918 | 9/1953 | Kelley et al. | 192—3.2 |
| 2,870,875 | 1/1959 | Cline | 60—54 X |

JULIUS E. WEST, *Primary Examiner.*

DAVID WILLIAMOWSKY, *Examiner.*